July 5, 1927.  1,635,047

H. T. LANG

DYNAMO ELECTRIC MACHINE

Filed March 10, 1925  2 Sheets-Sheet 1

Inventor:
Henry T. Lang,
by *his attorney signature*
His Attorney.

July 5, 1927.

H. T. LANG 1,635,047

DYNAMO ELECTRIC MACHINE

Filed March 10, 1925    2 Sheets-Sheet 2

Inventor:
Henry T. Lang,
by ............
His Attorney.

Patented July 5, 1927.

1,635,047

UNITED STATES PATENT OFFICE.

HENRY T. LANG, OF CLEVELAND, OHIO, ASSIGNOR TO ELECTRIC VACUUM CLEANER CO., INC., OF CLEVELAND, OHIO, A CORPORATION OF NEW YORK.

DYNAMO-ELECTRIC MACHINE.

Application filed March 10, 1925. Serial No. 14,358.

The present invention relates to dynamo-electric machines, and especially to small motors designed to operate at very high speeds, as 9,000 to 10,000 R. P. M. for example. Such motors have a wide application in the household, and especially for operating vacuum cleaners for which purpose the motor illustrated herein is especially designed.

At times attempts are made by persons unfamiliar with the problem to make repairs on the motors with the result of making them worse rather than better. Owners after having had such an experience sometimes bring their cleaners to service stations and demand free service, and unless the machine bears some unusual marks it is difficult or impossible to tell whether it has been tampered with or not.

My invention has for its object to improve machines of the character described by simplifying the construction of their casings to the end that less machine work is required and hence the cost of manufacture will be reduced. A further object of the invention is to so construct and arrange the parts that unauthorized opening of the motor can be detected.

For a consideration of what I believe to be novel and my invention, attention is directed to the accompanying description and the claims appended thereto.

Figure 3:
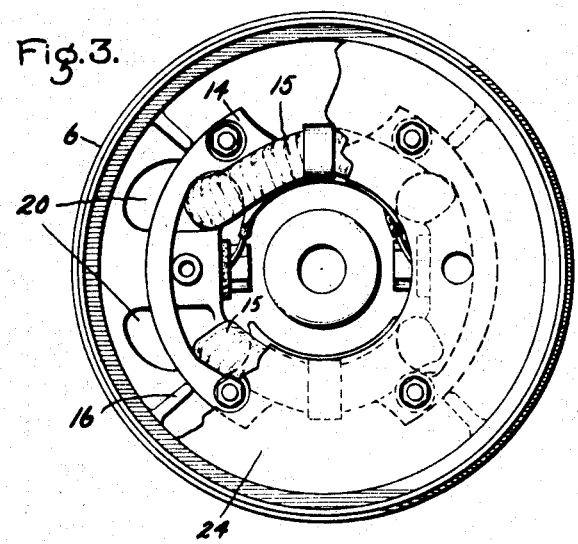
Figure 4:
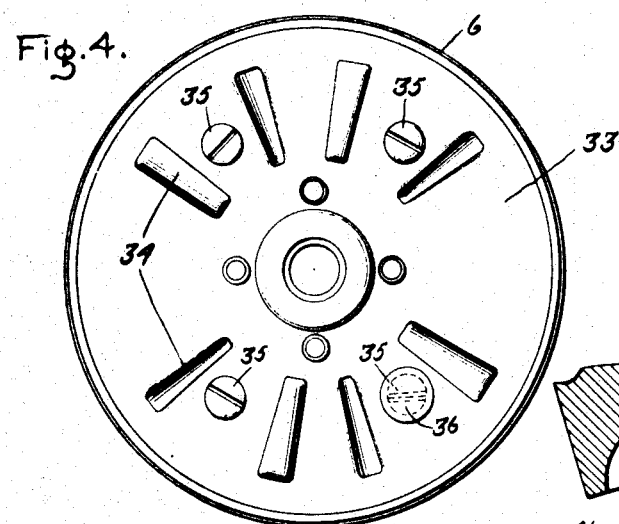
Figure 5:
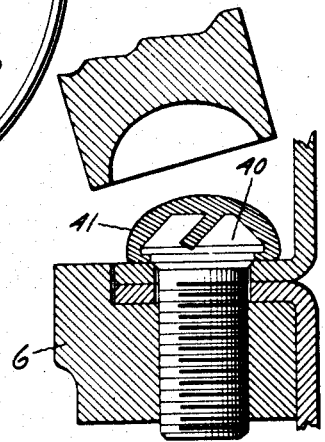
Figure 1:
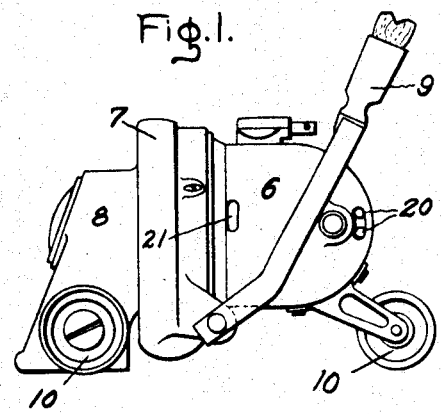
Figure 2:
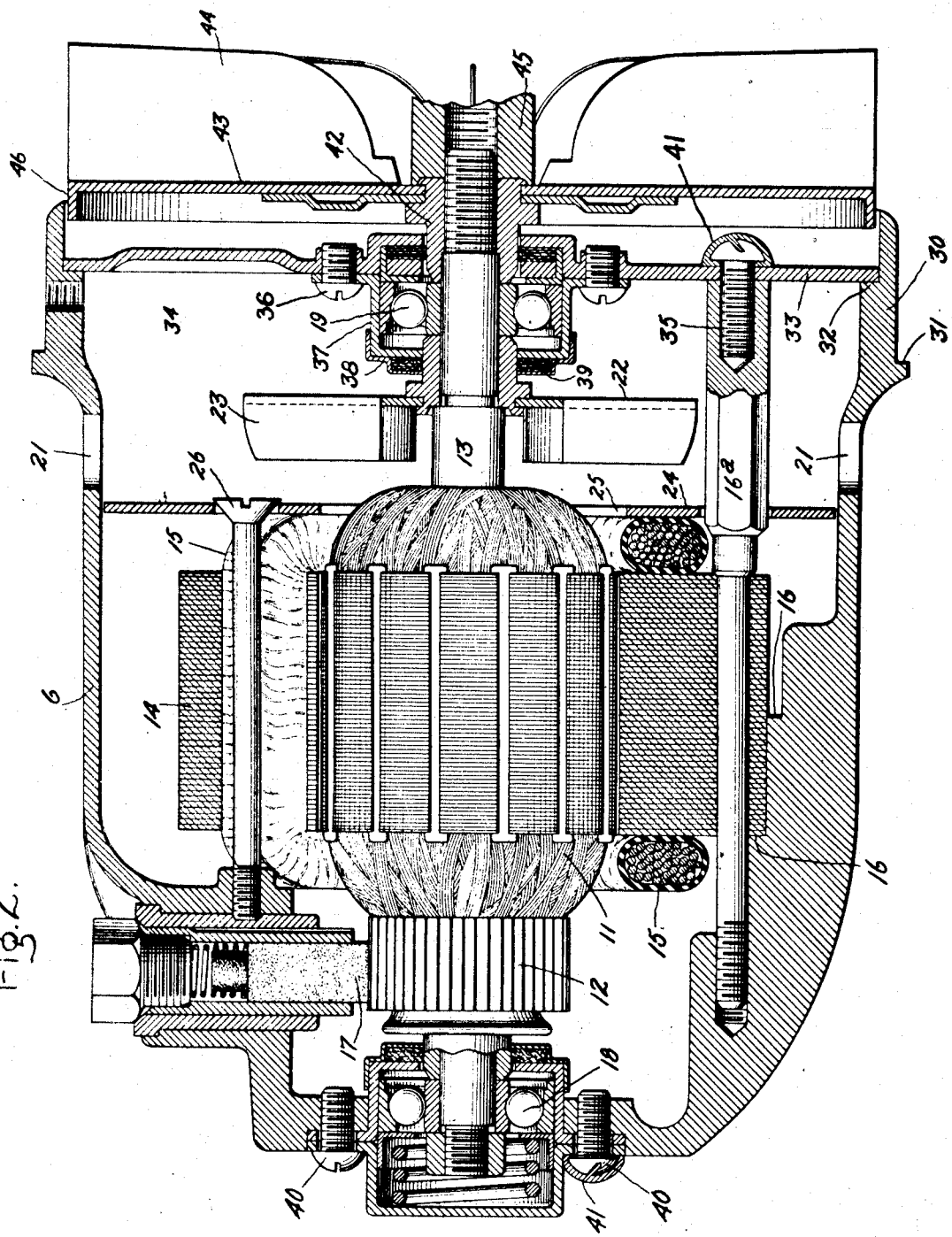

In the accompanying drawings which illustrate one of the embodiments of my invention, Fig. 1 is a view in elevation of a vacuum cleaner; Fig. 2 is a longitudinal section on an enlarged scale of the motor for driving the suction fan; Fig. 3 is a cross-section showing certain parts of the internal construction; Fig. 4 is a view in elevation of the detachable end head, and Fig. 5 is a detail view on an enlarged scale of the sealing means.

Referring to Fig. 1 which illustrates a horizontal shaft vacuum cleaner, 6 indicates the casing of the electric motor, 7 the suction fan casing, 8 the suction nozzle, 9 the operating handle, and 10 the supporting rollers.

Referring to Fig. 2, 11 indicates a suitably wound small armature designed to operate at high speeds, meaning by high speeds those in the order of 9,000 to 10,000 R. P. M. The armature and its commutator 12 are mounted on a horizontal shaft 13, the latter being carried in ball bearings located at opposite ends thereof. The armature is surrounded by a field magnet structure comprising a laminated field magnet 14 which in this case has two pole pieces as best shown in Fig. 3. The magnet is energized by two field coils 15. The motor is of the universal type, that is to say, is designed to operate either on direct or alternating current circuits. The magnet is seated on shouldered lugs 16 of which several are provided, four being shown in the present instance. The magnet is held in place by studs 16$^a$ which are elongated to support the rear end head, as will appear later.

The parts above described are enclosed in a casing 6 usually made of cast aluminum. In the casing are formed holders for the commutator brushes 17. The armature shaft is carried by ball bearings 18 and 19, the former being carried by the casing and the latter by an end head or disk adjacent the suction fan. By using suitable ball bearings packed in heavy lubricant the cleaner can, under ordinary conditions, be run for a year without additional lubricant. The casing is considerably larger than the field magnet as will be evident from Fig. 3, there being a surrounding free air space. At the commutator end of the casing and adjacent each brush holder are inlets 20 of which two are shown. Air for cooling the electrical parts enters through these openings and escapes through outlets 21 of which two or more are provided at the opposite end of the armature. On the shaft and substantially in line with the outlets or discharge openings is a ventilating fan 22 comprising a spider or other support having suitably shaped blades 23. A disk or plate 24 is located between the armature and the ventilating fan which shuts off the free passage of air around the magnet and which has a central orifice 25, the walls of which direct the air to the fan 22. The diameter of the orifice is approximately the same as that of the air gap between the armature and field and as a result, the air from the inlets passes through the field magnet instead of around it and over the field coils and the armature winding and especially over the end windings of the armature both at the commutator and rear ends. The disk 24 is retained in place by two or more screws 26 which pass between cut away portions of the magnet and are seated in the front end of the casing.

It has been the practice heretofore to make the rear end head of the casing an integral part thereof. This required making the casing in two parts and machining both parts to form the joint between them. I avoid the extra part with its additional cost by providing the casing with an annular integral extension 30 which has an external shoulder 31 adapted to seat on the casing 7 of the suction fan, Fig. 1, and an internal shoulder 32, Fig. 2, adapted to receive the end head or disk 33. The disk is made of relatively thin sheet metal accurately punched to size and is provided with radial stiffening ribs 34, Fig. 4, some of which project from one face and the remainder from the other face. By preference the ribs project alternately first from one face and then from the other. Such a disk when made of relatively thin metal as it should be for lightness and decreased cost has a tendency to vibrate and thus give rise to objectionable noise. To obviate this the metal forming the disk is put under stress in the region between the peripheral support and the center. For this purpose the studs 16ª which hold the field magnet are extended axially and are tapped to receive screws 35. By applying sufficient pressure through the screws the center region of the disk is slightly bowed which places the metal under tension and by so doing vibration is prevented. A deformation of one sixty-fourth of an inch will generally be sufficient.

In order to prevent unauthorized persons from tampering with the motor, I mount the shaft bearing 19 on the head in such manner that it can only be removed after the head is removed. In other words, the heads of the screws 36 which attach the bearing to the disk are on the inner face instead of on the outer face as would be the normal practice. I then seal the disk in place. A simple way to do this is to provide one of the screws 35 with a special head in which the tool slot instead of being axial is at an angle, see Fig. 5. Over the head 40 is applied a lead covering 41 which not only covers the head but by means of a suitable tool, indicated above the screw, is caused to flow under the head. The central portion of the lead covering is also marked in some distinctive way, as for example by a monogram. Destruction of the seal will of course be sufficient evidence of tampering.

The rear bearing comprises a sheet metal cup 37 in which is located a ball race, the other race being mounted on the shaft, and between the two is a single row of balls. On the inner end of the main cup is a small sheet metal cup or cover 38 and between the two is a soft packing 39 arranged to prevent lubricant in the bearing from working out. A similar packing is provided on the other end. The commutator end bearing is carried by the motor casing and one of the retaining screws 40 is covered by a lead seal 41 in the manner previously described.

Mounted on the rear end of the motor shaft is a suction fan comprising a hub 42, a web 43 and suitably formed blades 44. The hub is screw-threaded on the shaft and is locked in place by a nut 45 which is extended to form a pulley (not shown) for driving the nozzle brush. The fan disk is also provided with an inturned rim 46 which runs in close proximity to the annular surface of the extension 30, the purpose being to prevent the dirt which is sucked up by the fan from getting between the fan disk and rear head of the motor.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a dynamo-electric machine, the combination of an armature, a shaft therefor, bearings for the shaft, a field magnet structure which encloses the armature, a casing for the armature and magnet and on which the latter is supported, a thin metal disk member which is seated on the casing at one end thereof, carries one of the shaft bearings and serves to separate the machine parts from the device cooperating therewith, and means for anchoring said member in place and also for preventing the central portion thereof from vibrating.

2. In a dynamo-electric machine, the combination of an armature, a shaft therefor, bearings for the shaft, a field magnet structure which encloses the armature, a casing for the armature and magnet and on which the latter is supported, said casing having an internal shoulder, a thin metal disk which is seated on the shoulder, carries one of the bearings and serves to separate the machine parts from the device cooperating therewith, and means which exert strain on the disk in a region between the shoulder and bearing for holding the same in place and preventing vibration thereof.

3. In a dynamo-electric machine, the combination of an armature, a shaft therefor, bearings for the shaft, a field magnet structure, a casing for the armature and magnet, which has shoulders on which the magnet is seated, a second shoulder near one end, studs for securing the magnet on the first named shoulder, a thin metal disk which carries one of the bearings and is seated on the second shoulder, and screw means cooperating with the field magnet studs for exerting stress on the disk to hold the same on its shoulder and prevent vibration.

4. In a dynamo-electric machine, the combination of a small high speed armature, a field magnet therefor, a casing for said parts, a removable end head for the casing, a shaft for the armature, a bearing for the shaft which is secured to the head on its inner surface and is detachable only after the head is removed from the casing, supporting means for both the field magnet and the end head which are anchored in the casing, and means which cooperates with the supporting means for exerting stress on the head to hold the same in place and prevent vibration thereof.

5. In an apparatus of the character described, the combination of an electric motor, an enclosing casing therefor which has an integral extension provided with an external shoulder adapted to be seated on a support, an internal shoulder, an end head detachably supported on the internal shoulder, and an annular member which forms a part of the housing of the device driven by the motor.

6. In a dynamo-electric machine, a small high speed armature, a field magnet therefor, a casing for said parts, a removable end head for the casing, a shaft for the armature, bearings for the shaft, axially extending means which are anchored in the casing at one end and support both the field magnet and head, and means cooperating with said axially extending means, including an internal shoulder provided in the casing, for exerting stress on the head to hold the same in place and prevent vibration thereof.

In witness whereof, I have hereunto set my hand this 5th day of March 1925.

HENRY T. LANG.